United States Patent
Feng et al.

(10) Patent No.: US 11,533,637 B2
(45) Date of Patent: Dec. 20, 2022

(54) HIGH-MOBILITY RESOURCE ALLOCATION SYSTEM AND METHOD FOR SIMULATED USERS

(71) Applicant: National Yang Ming Chiao Tung University, Hsinchu (TW)

(72) Inventors: Kai-Ten Feng, Taipei (TW); En-Cheng Liou, Hsinchu (TW); Pei-Ying Wu, Kaohsiung (TW); Li-Hsiang Shen, Hsinchu (TW); Ching-Hsiang Lin, Taichung (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 133 days.

(21) Appl. No.: 17/191,966

(22) Filed: Mar. 4, 2021

(65) Prior Publication Data
US 2022/0225114 A1    Jul. 14, 2022

(30) Foreign Application Priority Data
Jan. 11, 2021  (TW) .................. 110100952

(51) Int. Cl.
*H04W 16/22* (2009.01)
*H04W 16/10* (2009.01)
(Continued)

(52) U.S. Cl.
CPC ............ *H04W 16/22* (2013.01); *G06N 20/00* (2019.01); *H04B 17/3912* (2015.01);
(Continued)

(58) Field of Classification Search
CPC ..... H04W 16/22; H04W 16/10; H04W 24/06; H04W 72/082; G06N 20/00; H04B 17/3912
See application file for complete search history.

(56) References Cited

U.S. PATENT DOCUMENTS 10,396,919 B1 * 8/2019 O'Shea .................. G06N 3/08
10,660,093 B2    5/2020 Schellmann et al.
(Continued)

FOREIGN PATENT DOCUMENTS

CN   103036665 B   6/2016
CN   103812629 B   1/2017
(Continued)

OTHER PUBLICATIONS

Huang et al., "A Big Data Enabled Channel Model for 5G Wireless Communication Systems", IEEE Transactions on Big Data, Jun. 1, 2020, vol. 6, No. 2, pp. 211-222.
(Continued)

*Primary Examiner* — Steven H Nguyen
(74) *Attorney, Agent, or Firm* — Birch, Stewart, Kolasch & Birch, LLP (57) ABSTRACT

A high-mobility resource allocation system and method for simulated users are provided, including a base station, antennas and a simulated mobile-user generator. The simulated mobile-user generator organizes a test field by taking the base station as the circle center, and measures and records multiple channel information based on the detection signals of the antennas. The machine learning module is used to perform simulation channel training according to channel information to generate simulated user channels that approximates real-world scenarios. A mobile-user organizing module organizes multiple simulated mobile users and their mobile channel information in the test field based on the simulated user channel, generates multiple simulated mobile user signals, and uses a resource-allocation optimizing module based on simulated mobile user signals, channel interference information upon moving, etc. to maximize the number of simulated mobile users while considering the quality of service.

16 Claims, 3 Drawing Sheets

(51) Int. Cl.
*H04W 72/08* (2009.01)
*H04W 24/06* (2009.01)
*H04B 17/391* (2015.01)
*G06N 20/00* (2019.01)

(52) U.S. Cl.
CPC ........... *H04W 16/10* (2013.01); *H04W 24/06* (2013.01); *H04W 72/082* (2013.01)

(56) References Cited

U.S. PATENT DOCUMENTS

| | | |
|---|---|---|
| 2020/0014476 A1 | 1/2020 | Xue et al. |
| 2020/0145129 A1 | 5/2020 | Nammi |
| 2020/0266910 A1* | 8/2020 | O'Shea ................... G06N 3/08 |

FOREIGN PATENT DOCUMENTS

| | | |
|---|---|---|
| CN | 110247719 A | 9/2019 |
| CN | 107248877 B | 6/2020 |
| TW | 200845617 A | 11/2008 |
| TW | 201607262 A | 2/2016 |
| TW | 201941553 A | 10/2019 |

OTHER PUBLICATIONS

Motade et al., "Channel estimation and data detection using machine learning for MIMO 5G communication systems in fading channel." Technologies 6.3, 2018, vol. 6, No. 72, pp. 1-16.

* cited by examiner

HIGH-MOBILITY RESOURCE ALLOCATION SYSTEM AND METHOD FOR SIMULATED USERS

This application claims priority of Application No. 110100952 filed in Taiwan on 11 Jan. 2021 under 35 U.S.C. § 119; the entire contents of all of which are hereby incorporated by reference.

BACKGROUND OF THE INVENTION

Field of the Invention

The present invention relates to a network simulation technique, and more particularly, to a high-mobility resource allocation system and method for simulated users.

Description of the Prior Art

In related art techniques, when performing channel simulations of a wireless signal transceiver or the channel simulations of the wireless signals between antennas and a base station, the impacts of the velocity and the attenuation of the signal scale are usually overlooked. When dealing with resource allocation issues, only the presence of noise is considered, without paying attention to the inter-subcarrier interference issues of the mobile users. In some cases, the sub-carrier spacing is dynamically configured according to the user's needs without considering the user's power allocation, and in some cases, the resource allocation of users upon moving fails to consider the interference caused by channel estimation errors. To overcome the issues encountered in real-world cases of mobile environments, the cross-layer user service quality issues should be also considered apart from the transception abilities.

However, the current simulation channel training methods still lack cross-layer considerations. Hence, when the testing party performs related verifications, it is difficult to focus on the improvement of the user experience. The second type of problem is that the design of the related user simulation equipment does not consider the allocation strategy of the wireless carriers, which can result in generating less simulated users. The third type of problem is that the design of the existing user simulators overlooks moving scenarios, making the testing party difficult to verify the network performance of mobile users.

Therefore, aiming at solving the above defects of related art techniques and fulfilling the possible needs in the future, the present invention proposes a high-mobility resource allocation system and method for simulated users. The specific structure and its implementation will be described in following paragraphs.

SUMMARY OF THE INVENTION

The main objective of the present invention is to provide a high-mobility resource allocation system and method for simulated users, which can not only perform offline training on a large number of mobile users for testing, but also can generate simulated mobile user signals according to the locations and velocities of the mobile users, with the reference of the service quality demands and the channel interference information of the simulated users, so as to maximize the number of the simulated mobile users while achieving the highest service quality.

Another objective of the present invention is to provide a high-mobility resource allocation system for simulated users and its method, which uses a machine learning module to optimize the carrier aggregation resource allocation strategy to greatly increase the number of simulated users.

Another objective of the present invention is to provide a high-mobility resource allocation system and method for simulated users, which can greatly increase the number of simulated users through the machine learning module collaborating with the optimized carrier aggregation resource allocation strategy.

Another objective of the present invention is to provide a high-mobility resource allocation system and method for simulated users, in which the channel interface of the users upon moving is considered in the resource-allocation optimizing module, and thus can verify the network performance when encountering the mobile users.

To achieve the above objectives, the present invention provides a high-mobility resource allocation system for simulated users, which comprises a plurality of antennas, a simulated mobile-user generator, a machine learning module, a simulation channel module, a mobile-user organizing module and a resource-allocation optimizing module. The antennas are arranged around a base station by taking the base station as the circle center, and arranged to send a plurality of detection messages. The simulated mobile-user generator is arranged to organize a test field taking the base station as the circle center, to measure and record a plurality of channel information between the antennas and the base station according to the detection messages of the antennas. The simulated mobile-user generator further comprises a machine learning module, a simulation channel module, a mobile-user organizing module and a resource-allocation optimizing module. The machine learning module is arranged to perform simulation channel training according to the channel information. The simulation channel module is connected to the machine learning module, and is arranged to generate a plurality of simulated user channels that approximates real-world scenarios according to at least one training result of the simulation channel training. The mobile-user organizing module is arranged to organize, within the test field, a plurality of simulated mobile users and channel information thereof upon moving, in order to generate a plurality of simulated mobile user signals. The resource-allocation optimizing module is connected to the mobile-user organizing module, and is arranged to maximize the number of the simulated mobile users in the test field according to the simulated mobile user signal, channel interference information upon moving and an antenna resource optimization algorithm.

According to an embodiment of the present invention, the simulated mobile-user generator further comprises a field-organizing module and an antenna measurement module. The field-organizing module is arranged to organize a test field with the base station as the circle center. The antenna measurement module is arranged to receive the detection messages of the antennas, and measure and record the channel information between the antennas and the channel information between the antennas and the base station.

According to an embodiment of the present invention, the simulated mobile-user generator further comprises an antenna transmission module connected to the field-organizing module, and the antenna transmission module controls the antennas to take turns sending the detection messages according to the test field generated by the field-organizing module.

According to an embodiment of the present invention wherein the simulated mobile-user generator further comprises a field-information database connected to the antenna measurement module, for storing the channel information.

According to an embodiment of the present invention, the machine learning module is connected to the field-information database, and performs the simulation channel training according to the channel information stored in the field-information database.

According to an embodiment of the present invention, the test field has a test radius. When the channel information of the simulated mobile users upon moving calculated by the mobile-user organizing module is not stored in the field-information database, the field-organizing module adjusts the test radius in order to generate new channel information for the machine learning module and the mobile-user organizing module.

According to an embodiment of the present invention, the mobile-user organizing module further comprises a mobile information module and a user-information generation module. The mobile information module is connected to the field-organizing module, and arranged to organize the simulated mobile users within the test field and organize coordinates and velocities of the simulated mobile users at each timepoint. The user-information generation module is connected to the mobile information module, and arranged to calculate the channel interference information of the simulated mobile users upon moving according to the coordinates and the velocities, in order to generate a plurality of simulated mobile user signals.

The present invention also discloses a high-mobility resource allocation method for simulated users, which comprises: arranging a plurality of antennas around a base station by taking the base station as the circle center, and controlling the antennas to take turns sending a plurality of detection messages; utilizing a simulated mobile-user generator organize a test field by taking the base station as the circle center, and measure and record a plurality of channel information between the antennas and the base station according to the detection messages of the antennas; utilizing a machine learning module in the simulated mobile-user generator to perform simulation channel training according to the channel information; utilizing a simulation channel module in the simulated mobile-user generator to generate a plurality of simulated user channels approximating real-world scenarios according to at least one training result of the simulation channel training; a mobile-user organizing module within the simulated mobile-user generator receiving the simulated user channels, so as to organize a plurality of simulated mobile users and the channel information thereof upon moving within the test field, to generate a plurality of simulated mobile user signals; and utilizing a resource-allocation optimizing module in the simulated mobile-user generator to maximize the number of the simulated mobile users within the test field according to the simulated mobile user signal, the channel interference information upon moving and an antenna resource optimization algorithm.

DETAILED DESCRIPTION OF THE INVENTION

The present invention provides a high-mobility resource allocation system and method for simulated users, which can generate a large number of simulated mobile users which send simulated mobile user signals to the base station, for testing whether the test field can meet the service quality requirements of the user device upon moving.

Figure 1:
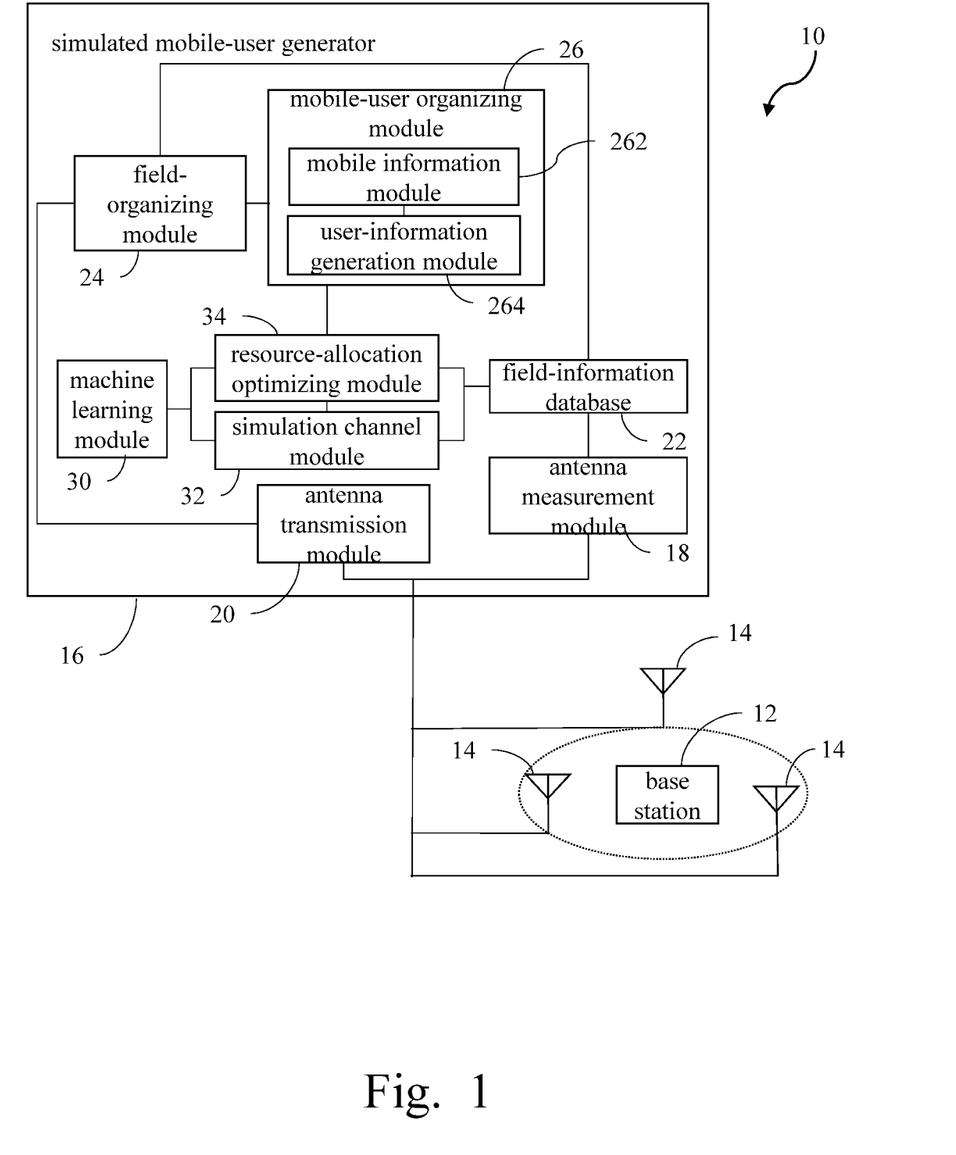
FIG. 1 is a block diagram illustrating a high-mobility resource allocation system for simulated users according to an embodiment of the present invention.

Please refer to FIG. 1, which is a block diagram illustrating a high-mobility resource allocation system 10 for simulated users according to an embodiment of the present invention. The high-mobility resource allocation system 10 of the present invention comprises a base station 12, a plurality of antennas 14 and a simulated mobile-user generator 16. The antennas 14 are arranged around the base station 12 by taking the base station 12 as the circle center and setting the quantity as at least three, taking turns sending a plurality of detection messages. The simulated mobile-user generator 16 comprises an antenna measurement module 18, an antenna transmission module 20, a field-information database 22, a field-organizing module 24, a mobile-user organizing module 26, a machine learning module 30, a simulation channel module 32 and a resource-allocation optimizing module 34. The mobile-user organizing module 26 comprises a mobile information module 262 and a user-information generation module 264. Both the antenna measurement module 18 and the antenna transmission module 20 are connected to the antennas 14, the field-information database 22 is connected to the antenna measurement module 18 and the field-organizing module 24, the field-organizing module 24 is connected to the antenna transmission module 20 and the mobile information module 262, and the user-information generation module 264 is connected to the mobile information module 262. The machine learning module 30 is connected to the antenna measurement module 18 via the simulation channel module 32, the resource-allocation optimizing module 34 and the field database 22. The simulation channel module 32 is connected to the field-information database 22, the machine learning module 30 and the resource-allocation optimizing module 34. The resource-allocation optimizing module 34 is connected to the mobile-user organizing module 26, the field-information database 22 and the machine learning module 30.

The simulated mobile-user generator 16 is a device that simulates wireless signal transmissions, and is used to generate a plurality of simulated mobile user signals to the base station 12. The wireless device simulated by the simulated mobile-user generator 16 may include, but not limited to, user equipment (UE), software radio (SDR), NetFPGA, Internet of Things (IoT), pager or any other types of devices that can operate in a wireless environment, or combinations containing other types of radio frequency units.

The field-organizing module 24 may organize a test field by taking the base station 12 as the circle center. For example, the test field may be a circle, and the antennas 14 may be arranged on its circumference, but the present invention is not limited thereto. In some undrawn embodiments, the test field may also be an ellipse or in other shapes. The antenna measurement module 18 receives detection messages from the antennas 14, so as to measure and record the channel information between the antennas 14 and the channel information between the antennas 14 and the base station 12. The channel information is stored in the field-information database 22. The antenna transmission module 20 controls the antennas 14 to take turns sensing detection messages according to the test field generated by the field-organizing module 24. The machine learning module 30 performs simulation channel training according to the channel information measured by the antenna measurement module 18 or the channel information stored in the field-information database 22. The simulation channel module 32 generates a plurality of simulated user channels that approximates real-world scenarios according to the training result of the simulation channel training obtained by the machine learning module 30. The mobile-user organizing module 26 is arranged to organize a plurality of simulated mobile users and the channel information thereof upon moving in the test field, to generate a plurality of simulated mobile user signals, wherein the mobile information module 262 in the mobile-user organizing module 26 obtains the test field organized by the field-organizing module 24, organizes a plurality of simulated mobile users in the test field, and organizes the coordinates and velocities of the simulated mobile user at each timepoint. The resource-allocation optimizing module 34 is connected to the mobile-user organizing module 26, and maximizes the number of simulated mobile users in the test field according to the simulated mobile user signals, the channel interference information upon moving and an antenna resource optimization algorithm.

Figure 2:
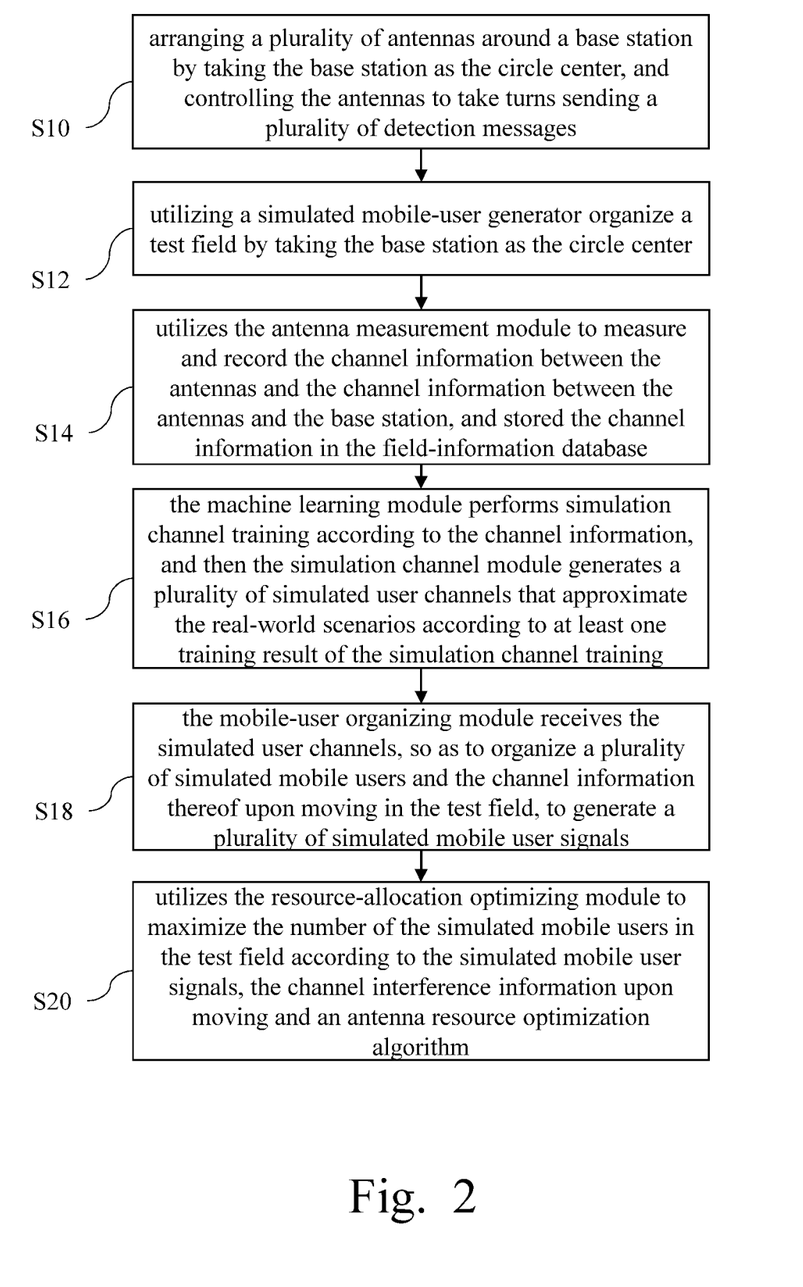
FIG. 2 is a flowchart illustrating a high-mobility resource allocation method according to an embodiment of the present invention.

Please refer to FIG. 2, which is a flowchart illustrating a high-mobility resource allocation method according to an embodiment of the present invention. In Step S10, antennas 14 are arranged around the base station 12 by taking the base station 12 as the circle center, and take turns sending a plurality of detection messages. In Step S12, the simulated mobile-user generator 16 is utilized to organize a test field by taking the base station 12 as the circle center. Step S14 utilizes the antenna measurement module 18 to measure and record the channel information between the antennas 14 and the channel information between the antennas 14 and the base station 12, and stored the channel information in the field-information database 22. In Step S16, the machine learning module 30 in the simulated mobile-user generator 16 is utilized to perform simulation channel training according to the channel information, and then the simulation channel module 32 in the simulated mobile-user generator 16 is utilized to generate a plurality of simulated user channels that approximate the real-world scenarios according to at least one training result of the simulation channel training. In Step S18, the mobile-user organizing module 26 is utilized to receive the simulated user channels generated by the simulation channel module 32, so as to organize a plurality of simulated mobile users and the channel information thereof upon moving in the test field, to generate a plurality of simulated mobile user signals. Lastly, Step S20 utilizes the resource-allocation optimizing module 34 in the simulated mobile-user generator 16 to maximize the number of the simulated mobile users in the test field according to the simulated mobile user signals, the channel interference information upon moving and an antenna resource optimization algorithm.

The machine learning algorithm used in the machine learning module 30 of the present invention includes, but is not limited to, software, hardware, or other existing algorithms capable of assisting the machine learning, artificial intelligence, deep learning, neural network, etc., or other algorithms, mathematical equations or manual judgment methods to that can equivalently achieve the same work tasks.

Figure 3:
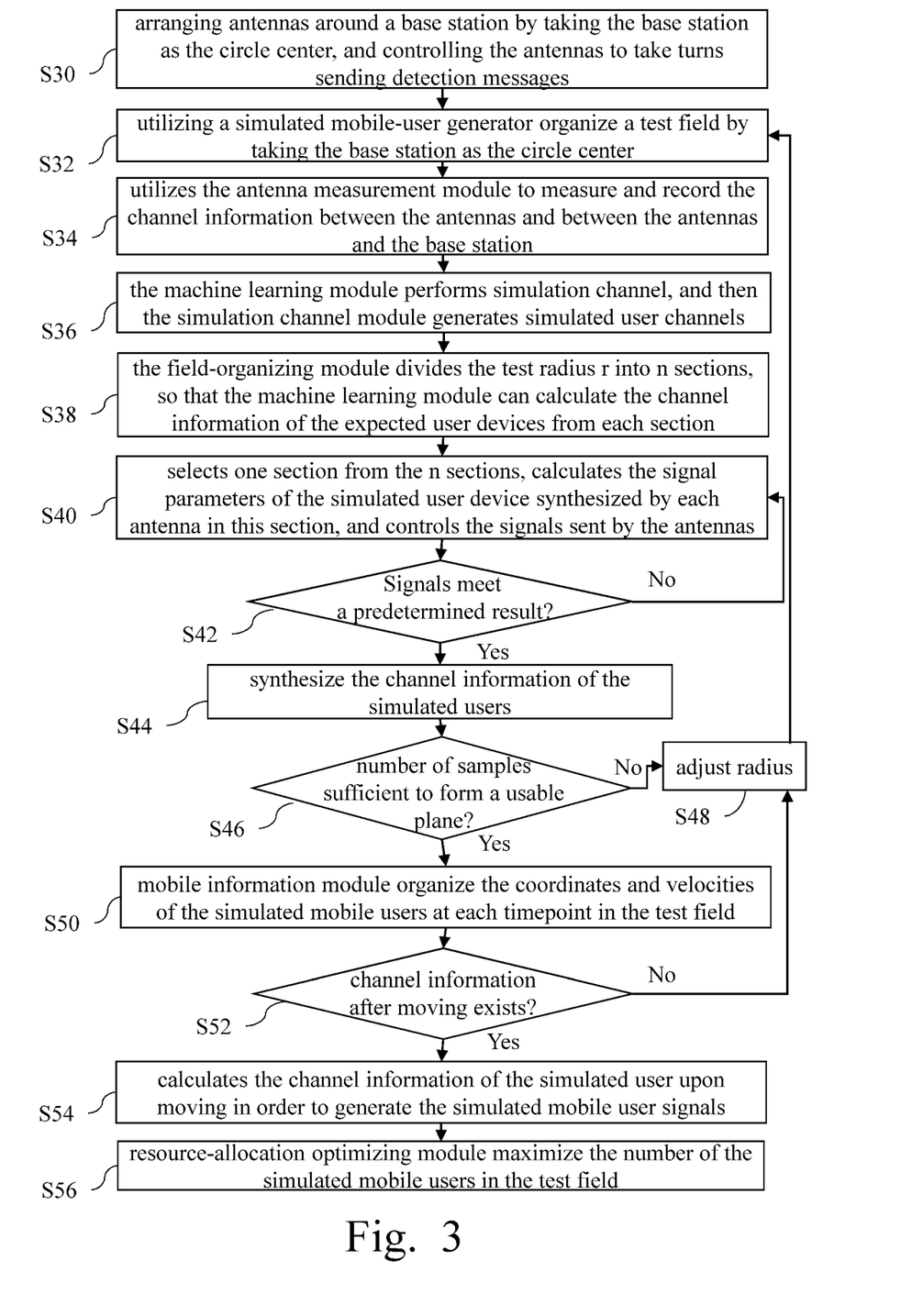
FIG. 3 is a flowchart illustrating a high-mobility resource allocation method according to another embodiment of the present invention.

In the present invention, the largest test field the antennas 14 formed is when all of three antennas 14 are located on the circumference. In this case, the test radius r of the test field can be divided into n sections, so as to adjust the test radius for changing the size of the test field, recalculate the channel information of users, and reallocate the number of the simulated mobile users. The detailed allocation method is shown in FIG. 3, which is a flowchart illustrating a high-mobility resource allocation method according to another embodiment of the present invention, wherein Steps S30-S34 in FIG. 3 are identical to Steps S10-S14 in FIG. 2. In Step S30, the antennas 14 are arranged around the base station 12 by taking the base station 12 as the circle center, and take turns sending a plurality of detection messages. In Step S32, the simulated mobile-user generator 16 is utilized to organize a test field with the base station 12 being the circle center. Step S34 utilizes the antenna measurement module 18 to measure and record the channel information between the antennas 14 and the channel information between the antennas 14 and the base station 12, wherein the channel information is stored in the field-information database 22. Next, in Step S36, the machine learning module 30 performs simulation channel training according to the channel information, and utilizes a simulation channel module 32 to generate a plurality of simulated user channels that approximate the real-world scenarios according to the training result of the simulation channel training. In Step S38, the field-organizing module 24 divides the test radius r into n sections to form n concentric circles with base station 12 as the circle center, so that the machine learning module 30 can refer to the channel information in the field-information database 22 to calculate the channel information of the expected user devices from each section. For example, the machine learning module 30 may sequentially calculate from the smallest test field with the test radius r/n to the test fields with the test radiuses 2r/n, 3r/n . . . nr/n. Step S40 selects one section from the n sections, calculates the signal parameters of the simulated user device synthesized by each antenna in this section, and controls the signals sent by the antennas 14 for testing. If Step S42 determines that the signals received by the antennas 14 meet a predetermined result, the next step will be performed, or otherwise Step S40 is reentered to recalculate the signal parameters of the simulated user devices synthesized by each antenna in this section. When Step S42 determines that the signals received by the antennas 14 meet the predetermined result, Step S44 is performed to utilize the field-information database 22 to synthesize the channel information of the simulated users. Step S46 determines whether currently the number of circumference samples of concentric circles stored in the field-information database 22 is sufficient to form a usable plane, if not, the radius r of Step S48 will be adjusted, i.e. the size of the test field will be enlarged, and then the flow goes back to Step S32. Otherwise, if currently the number of circumference samples of concentric circles stored in the field-information database 22 is sufficient enough to form a usable plane, the flow continues to perform Step S50 to utilize a mobile information module 262 to organize the coordinates and velocities of the simulated mobile users at each timepoint in the test field. Then, Step S52 determines whether the channel information after moving exists in the field-information database 22, if not, Step S48 is performed to adjust the radius r to change the size of the test field, and then the flow goes back to Step S32. Otherwise, if the channel information after moving exists in the field-information database 22, the flow continues to perform Step S54, where the simulation channel module 32 calculates the channel information of the simulated user upon moving in order to generate the simulated mobile user signals. Lastly, Step S56 utilizes the resource-allocation optimizing module 34 in the simulated mobile-user generator 16 to maximize the number of the simulated mobile users in the test field according to the simulated mobile user signals, channel interference information upon moving and an antenna resource optimization algorithm.

It should be noted that in the flowchart shown in FIG. 3, Steps S30-S52 may be offline training, Steps S54-S56 may be online training.

The present invention not only generates a large amount of simulated mobile users, but also can determine whether the current test field is capable of meeting the service quality requirements of the user devices upon moving.

The following describes how the optimized resource-allocation module 34 maximizes the quantity of the simulated mobile user. Assuming the simulated user generator may simulate N simulated mobile users (e.g. Virtual User Equipment (VUE)), and the velocity of each simulated mobile user is $x_n$. The resource the base stations is K subcarriers, the interval o each two adjacent subcarriers is $\Delta f$. The OFDM symbol of the expected base station receive signal may be presented as: $y_k^{m,n} = v_k^n s_k^{m,n} + n_k^{m,n}$, wherein $s_k^{m,n}$ is the signal to be sent by the simulated mobile user, $v_k^n$ is a virtual channel of the simulated mobile user, $n_k^{m,n}$ is a virtual channel pre-generated by machine learning and stored in the database. Since the system uses physical antennas to performs signal transmissions, frequency response of physical channels are thus generated, which is represented by $h_k^m$. In order to eliminate this frequency response by using precoding, after the simulated mobile user generator performs channel evaluations, one $\hat{h}_k^m$ is provided to eliminate the frequency response of this physical channel, wherein $\hat{h}_k^{m-1}$ is combined with virtual channel $v_k^n$ generated by the simulated mobile user generate, forming the mechanism $w_k^{m,n}$ which is capable of eliminating the frequency response of the physical channel. After the physical base station receives the signal $y_k^{m,n}$ from the simulated mobile user generator, it is improved as: $y_k^{m,n} = h_k^m w_k^{m,n} s_k^{m,n} + n_k^{m,n}$. Further, there might be difference between the above channel evaluation and the actual channel, which can be represented by $\in_k^m$. This error might cause a physical 5G base station to suffer from a distortion component $\in_k^m w_k^{m,n} s_k^{m,n}$ upon receiving the signal transmitted by the simulated mobile user generator, thus the received signal should be presented in: $v_k^n s_k^{m,n} + \in_k^m w_k^{m,n} s_k^{m,n} + n_k^{m,n}$. This distortion component affects the scale of the Signal to Interference Noise Ratio (SINR). Therefore, the entire system selects antennas by evaluating which antenna can minimize $w_k^{m,n}$, so as to select the m-th antenna at the k-th subcarrier as the optimal solution, to send the statistics of the n-th simulated mobile user.

In order to obtain this optimal solution, the SINR of the calculation system is presented as the following equation(1):

$$\Gamma_k^{m,n} = \frac{P_k^{m,n} |v_k^n|^2 \rho_k^{m,n}}{N_0 \Delta f + ICI_k + \sigma_e^2 P_k^{m,n} |w_k^{m,n}|^2 \rho_k^{m,n}} \quad (1)$$

wherein $P_k^{m,n} |v_k^n|^2 \rho_k^{m,n}$ is the power product designated to the simulated mobile user and the channel, wherein $P_k^{m,n}$ is the transmission power of the m-th antenna at the k-th subcarrier when transmitting the n-th simulated mobile user, and $\rho_k^{m,n}$ is the index of the resource allocation, in which $\rho_k^{m,n}=1$ means that the m-th antenna will be allocated to the n-th simulated mobile user at the kth subcarrier. $N_0 \Delta f + ICI_k + \sigma_e^2 P_k^{m,n} |w_k^{m,n}|^2 \rho_k^{m,n}$ denotes the power product of the noise power, wherein $ICI_k$ denotes the inter-carrier interference. Considering the interference caused by the velocity of the simulated mobile user, another distortion component $\sigma_e^2 P_k^{m,n} |w_k^{m,n}|^2 \rho_k^{m,n}$ is the distortion between the evaluation channel of the simulated mobile user generator and the physical channel, wherein $\sigma_e^2$ denotes the amount of extra noise caused by distortion. From this signal-to-noise ratio, the spectrum efficiency equation can be obtained as the following equation (2):

$$R^n = \sum_{k=1}^{K} \sum_{m=1}^{M} \log_2(1+\Gamma_k^{m,n}) \quad (2)$$

This optimal solution is about to receive the maximized sum rate $$\max_{P_k^{m,n}, \rho_k^{m,n}} \sum_{n=1}^{N} R^n$$

obtained by all simulated mobile user signals. The problem to be solved is a mixed integer nonlinear problem (MINLP). The goal of solving this problem is to convert the above equation into a convex function optimization problem, which can then be solved by using the existing solution tool cvx tool. In order to achieve this goal, three problems need to be overcome. The first problem is a coupled variable problem resulted from the multiplication of the power distribution to be solved and the subcarrier parameters in the system, which increases the complexity of the system. The second problem is a non-concave function problem resulted from that the equation to be calculated contains a log equation. The third problem is encountering indifferentiable situations, which is resulted from the subcarrier parameter being a binary number.

Regarding the first problem, i.e. the coupled variable problem, the solution is to redefine the coupled variable (which is considered problematical) into a new variable $\tilde{P}_k^{m,n} = P_k^{m,n} \rho_k^{m,n}$, and add a subcarrier new limitation $\tilde{P}_k^{m,n} \leq \rho_k^{m,n} P_{max}$. The objective is to make $P_k^{m,n}$ avoid allocating resources to a subscriber when this subcarrier or the antenna has not allocated resources to the VUE.

Regarding the second problem, i.e. the non-concave function problem, the solution is to adopt a method of difference of convex function (DC) as shown in the equation (3). The equation (3) decomposes the log equation into two non-concave functions with one minus the other. However, since the result might not definitely be a non-concave function, the second equation is expanded with Taylor expansion, and then solved by an iteration method, as shown in the equation (3).

$$\tilde{R}^n = \sum_{k=1}^{K} \sum_{m=1}^{M} \log_2\left(1 + \frac{\tilde{P}_k^{m,n} |v_k^n|^2}{N_0 \Delta f + I\tilde{C}I_k + \sigma_e^2 \tilde{P}_k^{m,n} |w_k^{m,n}|^2}\right) = \quad (3)$$

$$f_1(\tilde{P}) - f_2(\tilde{P}) \approx f_1(\tilde{P}) - \left(f_2(\tilde{P}') + \nabla_{\tilde{P}} f_2^T(\tilde{P}')(\tilde{P}-\tilde{P}')\right)$$

Regarding the third problem of encountering indifferentiable situations, the goal is to solve the binary number issue of the parameter $\rho_k^{m,n} \in \{0, 1\}$ of the subcarrier. The limitations on this parameter should be loosen to a continuous variable ranging between 0 and 1, and then adding the following new limitation: $\Sigma_{m=1}^{M}\Sigma_{k=1}^{K}\Sigma_{n=1}^{N}\rho_k^{m,n}-\rho_k^{m,n^2}\leq 0$ the goal is to define the range of this parameter. But this limitation still has the non-convex function problem, so the equation needs to redefine as following equation (4):

$$\max_{P_k^{m,n},\rho_k^{m,n}} \sum_{n=1}^{N} f_1(\tilde{P}) - \qquad (4)$$

$$(f_2(\tilde{P}') + \nabla_{\tilde{P}} f_2^T(\tilde{P}')(\tilde{P}-\tilde{P}')) - \beta\sum_{m=1}^{M}\sum_{k=1}^{K}\sum_{n=1}^{N}\rho_k^{m,n} - \rho_k^{m,n^2}$$

As a result, a set of equations can be formed by one of two concave functions subtracting the other. By referring to the solution of the second problem to perform a Taylor expansion, a convex function problem can be formed for utilizing the cvx tool to perform operation to obtain the important resource allocation algorithm of the present invention as the following equation (5):

$$\sum_{n=1}^{N} f_1(\tilde{P}) - (f_2(\tilde{P}^{(t-1)}) + \nabla_{\tilde{P}} f_2^T(\tilde{P}^{(t-1)})(\tilde{P}-\tilde{P}^{(t-1)})) \qquad (5)$$

$$\max_{P_k^{m,n},\rho_k^{m,n}} -\beta\sum_{m=1}^{M}\sum_{k=1}^{K}\sum_{n=1}^{N} (\rho_k^{m,n} - \rho_k^{m,n^2})^{(t-1)} -$$

$$(1 - 2\rho_k^{m,n})^{(t-1)}(\rho_k^{m,n} - \rho_k^{m,n(t-1)})$$

Therefore, the present invention can design according to the generative adversarial network (GAN), which takes the locations and velocities of the simulated users as inputs. During the offline training, by using the machine learning module of the depth generation adversarial network deep learning to generate a simulated channel signal with mobility, and using the Empirical/Ray-Tracing based generator to generate the correct real-world channel as the training label, the difference between the real-world channel and the simulated channels can be minimized. During online testing, the mobile information module directly generates the location and the velocity of a random user, and a channel signal with mobility can be obtained via the depth generation adversarial network deep learning. Next, the zero forcing (ZF) equalizer can obtain the matrix coefficients mapped from the simulated channel to the physical channel by using an inverse matrix method. Those matrix coefficients can be later applied onto the pre-transmitted subcarriers and MIMO antennas.

At the reception end, the base station receives the simulation signal with mobility mapped from the physical antenna, and then demodulates the simulation signal source to calculate the related system performance, such as signal-to-noise ratio, transmission rate, transmission error rate, etc.

The above-mentioned embodiments, however, are merely the preferred embodiments of the present invention, and are not meant to limit the scope of the present invention. Therefore, all changes or modifications made in accordance with the characteristics and spirit of the scope of the present invention shall fall within the scope of the present invention.

What is claimed is:

1. A high mobility resource allocation system for simulated users, comprising:
    a plurality of antennas, arranged to locate around a base station by taking the base station as a circle center, and arranged to send a plurality of detection messages; and
    a simulated mobile-user generator including a processor and a field-information database, wherein the processor is programmed to:
        organize a test field taking the base station as the circle center, receive the detection messages of the antennas, and measure and record a plurality of channel information between the antennas and the base station according to the detection messages of the antennas
        perform simulation channel training according to the channel information;
        generate a plurality of simulated user channels that approximates real-world scenarios according to at least one training result of the simulation channel training;
        organize, within the test field, a plurality of simulated mobile users and channel information thereof upon moving, in order to generate a plurality of simulated mobile user signals; and
        maximize the number of the simulated mobile users in the test field according to the simulated mobile user signals, channel interference information upon moving and an antenna resource optimization algorithm.

2. The high-mobility resource allocation system according to claim 1, wherein the processor is further programmed to control the antennas to take turns sending the detection messages according to the test field.

3. The high-mobility resource allocation system according to claim 1, wherein the processor is further programmed to store the channel information in the field-information database.

4. The high-mobility resource allocation system according to claim 3, wherein the processor is further programmed to perform the simulation channel training according to the channel information stored in the field-information database.

5. The high-mobility resource allocation system according to claim 3, wherein the test field has a test radius, and the processor is further programmed to adjust the test radius to generate new channel information in response to the channel information of the simulated mobile users upon moving being calculated to be not stored in the field-information database.

6. The high-mobility resource allocation system according to claim 1, wherein the processor is further programmed to:
    organize the simulated mobile users within the test field and organize coordinates and velocities of the simulated mobile users at each timepoint; and
    calculate the channel interference information of the simulated mobile users upon moving according to the coordinates and the velocities, in order to generate a plurality of simulated mobile user signals.

7. A high-mobility resource allocation method for simulated users, comprising:
    arranging a plurality of antennas around a base station by taking the base station as a circle center, and controlling the antennas to take turns sending a plurality of detection messages;
    organizing a test field by taking the base station as the circle center, and measuring and recording a plurality of channel information between the antennas and the base station according to the detection messages of the antennas;
    performing a simulation channel training according to the channel information;

generating a plurality of simulated user channels approximating real-world scenarios according to at least one training result of the simulation channel training;

receiving the simulated user channels, so as to organize a plurality of simulated mobile users and the channel information thereof upon moving within the test field, to generate a plurality of simulated mobile user signals; and maximizing the number of the simulated mobile users within the test field according to the simulated mobile user signal, the channel interference information upon moving and an antenna resource optimization algorithm.

8. The high-mobility resource allocation method according to claim 7, further comprising the step of receiving the detection messages of the antennas, and measuring and recording channel information between the antennas and the channel information between the antennas and the base station.

9. The high-mobility resource allocation method according to claim 7, wherein the test field with the base station as the circle center is organized by a simulated mobile-user generator including a processor and a information database.

10. The high-mobility resource allocation method according to claim 9, further comprising the step of controlling the antennas to take turns sending the detection messages according to the test field generated by the processor.

11. The high-mobility resource allocation method according to claim 9, further comprising the step of storing the channel information between the antennas and the base station in the field-information database.

12. The high-mobility resource allocation method according to claim 11, further comprising the step of performing the simulation channel training according to the channel information stored in the field-information database.

13. The high-mobility resource allocation method according to claim 7, further comprising the steps of:

organizing the simulated mobile users within the test field and organizing coordinates and velocities of the simulated mobile users at every time point; and calculating channel interference information of the simulated mobile users upon moving according to the coordinates and the velocities, in order to generate a plurality of simulated mobile user signals.

14. The high-mobility resource allocation method according to claim 13, wherein the test field has test radius, and wherein the method further comprises the step of adjusting the test radius in order to generate new channel information in response to channel information of the simulated mobile users upon moving being calculated to be not stored in the field-information database.

15. The high-mobility resource allocation method according to claim 7, further comprising the step of performing resource allocation on subcarriers, transmission powers, numerologies and the antennas based on channel measurement of different simulated users upon moving, inter-subcarrier interference (ICI) and errors of a simulated mobile-user generator including a processor and a field-information database.

16. The high-mobility resource allocation method according to claim 15, further comprising the step of applying an environment adopting Difference of Convex Function Approximation and Convex Optimization Iteration Learning Simulation Channel algorithms, in order to obtain an optimal solution of allocating the subcarriers, transmission powers, numerologies and antennas.

* * * * *